United States Patent
Su

(10) Patent No.: US 8,220,610 B2
(45) Date of Patent: Jul. 17, 2012

(54) OVERLOAD PROTECTION DEVICE

(75) Inventor: Xiao-Guang Su, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 413 days.

(21) Appl. No.: 12/565,728

(22) Filed: Sep. 23, 2009

(65) Prior Publication Data

US 2010/0252388 A1    Oct. 7, 2010

(30) Foreign Application Priority Data

Apr. 2, 2009 (CN) .......................... 2009 1 0301322

(51) Int. Cl.
*F16D 43/202* (2006.01)
*F16D 7/04* (2006.01)
(52) U.S. Cl. ................ 192/56.42; 192/56.56; 192/69.1; 192/84.3; 464/38
(58) Field of Classification Search ...... 192/56.4–56.42, 192/69.1, 84.3; 464/29, 30, 38
See application file for complete search history.

(56) References Cited

U.S. PATENT DOCUMENTS

| 3,194,371 | A | * | 7/1965 | Rabinow | 192/56.42 |
| 4,271,944 | A | * | 6/1981 | Hanson | 192/56.4 |
| 4,825,992 | A | * | 5/1989 | Skrobisch | 192/56.4 |

* cited by examiner

*Primary Examiner* — Richard M. Lorence
(74) *Attorney, Agent, or Firm* — Altis Law Group, Inc.

(57) ABSTRACT

An overload protection device for protecting a motor from overload is disclosed. The overload protection device includes a shaft and a load carrying member driven by the driving portion of the shaft. The shaft includes a shaft body and a driving portion on an end of the shaft body. The load carrying member includes at least one magnetic member corresponding to the driving portion. Each of the at least one magnetic member includes a first magnetic member fixed on the load carrying member and a second magnetic member rotatably fixed on the load carrying member. The first magnetic member is located between the second magnetic member and the driving portion of the shaft and the same poles of the first and second magnetic member are opposite to each other. The driving portion is engaged with the first magnetic member and impels the first magnetic member to rotate the load carrying member under the rated load of the motor.

8 Claims, 2 Drawing Sheets

OVERLOAD PROTECTION DEVICE

BACKGROUND

1. Technical Field

The present disclosure relates to an overload protection device.

2. Description of Related Art

A driving device, such as a motor, usually includes an overload protection device for protecting the driving device from damage in case of overload. Currently, most overload protection device is complex, and may need a controlling circuit for switching off the motor when an overload occurs. Therefore, the cost of a driving device with such an overload protection device is increased.

What is needed, therefore, is an overload protection device to overcome the above-mentioned problems.

DETAILED DESCRIPTION

Figure 1:
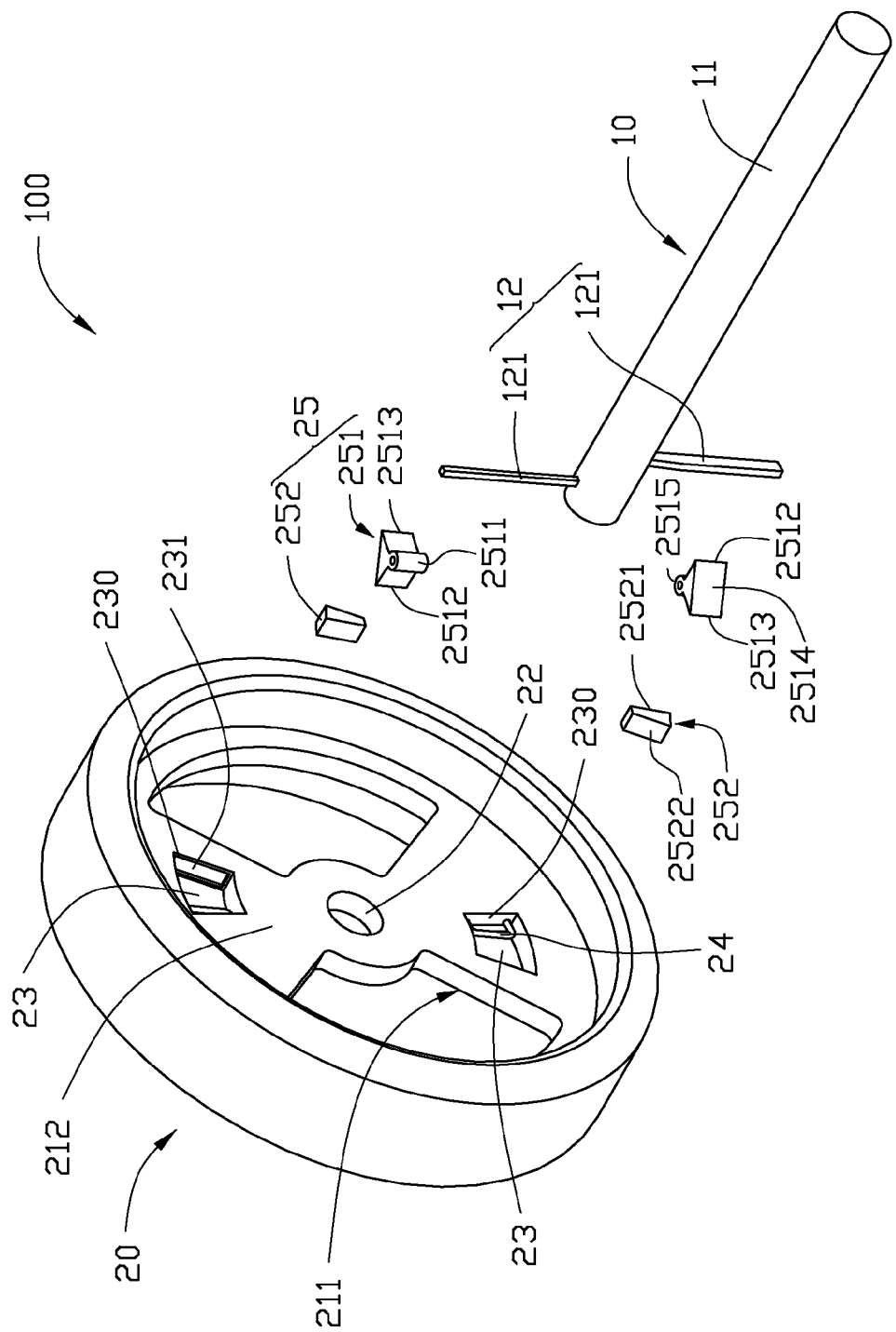
FIG. 1 is an isometric, exploded view of an overload protection device, according to an exemplary embodiment of the present disclosure.
Figure 2:
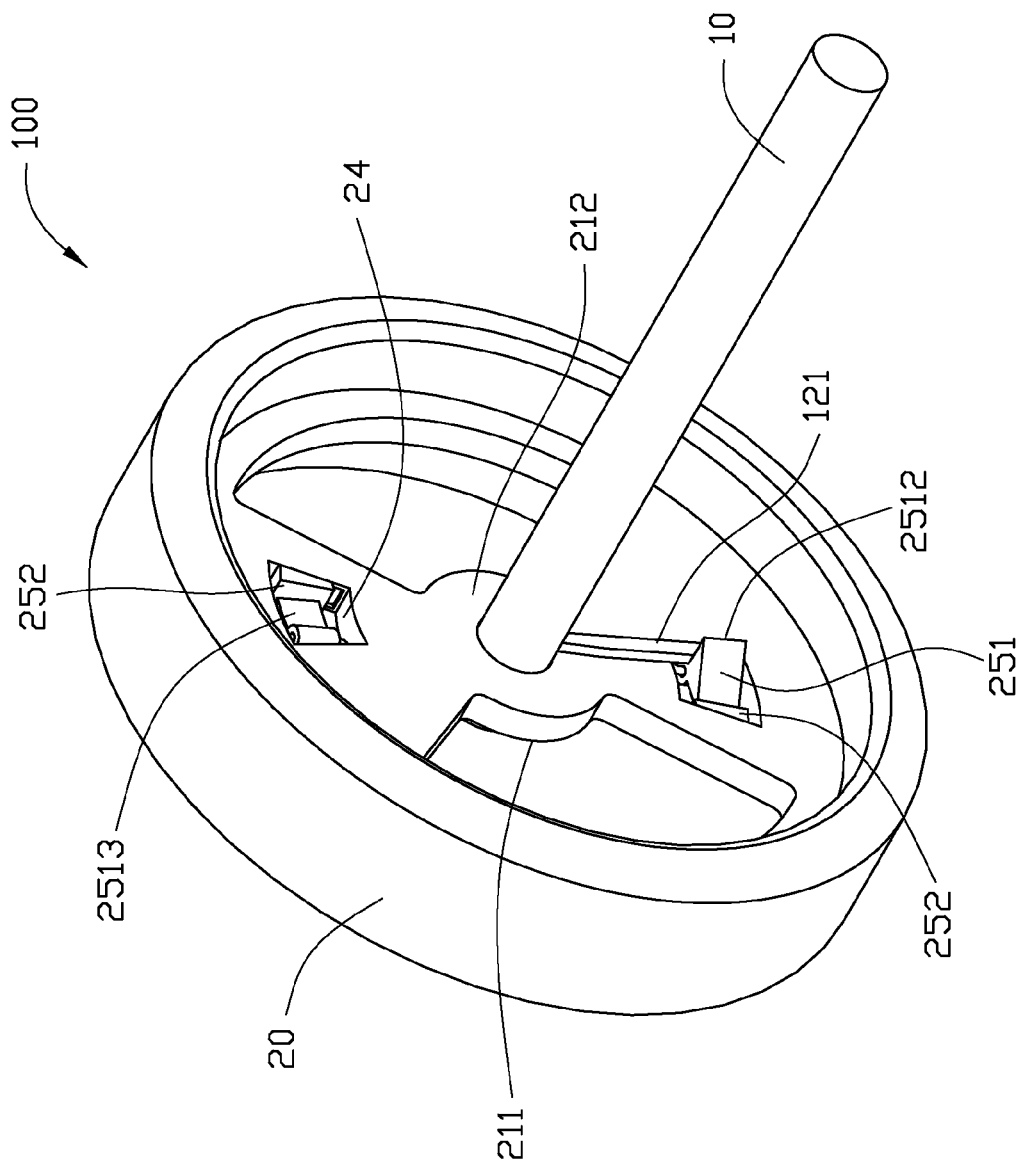
FIG. 2 is an assembled view of the overload protection device of FIG. 1.

Referring to FIG. 1 and FIG. 2, an overload protection device 100, according to an exemplary embodiment, is shown. The overload protection device 100 includes a shaft 10 and a load carrying member 20.

The shaft 10 includes a cylindrical shaft body 11 and a driving portion 12 on an end of the shaft body 11. The driving portion 12 includes a number of driving bars 121 radially protruding from the shaft body 11, the number of driving bars 121 are separated from each other, for a distance, along a central axis of the shaft body 11.

The load carrying member 20 is shaped as a wheel and can be connected to a load (not shown) to drive the load. In this embodiment, the load carrying member 20 can be a gear wheel, or a belt pulley, etc. The load carrying member 20 includes a first side surface 211 and a second side surface 212 opposite to the first side surface 211. A shaft hole 22 is defined in the center of the load carrying member 20 and a number of centrally symmetric openings 23 are distributed around the shaft hole 22, each opening 23 corresponds to one of the driving bars 121. In this embodiment, each opening 23 is generally sector-shaped. Each opening 23 includes two opposite side surfaces 230. A fixing shaft 24 is fixed on one of the opposite side surfaces 230, and a groove 231 is defined in the other of the opposite side surfaces 230. The load carrying member 20 includes a number of magnetic members 25 corresponding to the openings 23. Each magnetic member 25 includes a first magnetic member 251 and a second magnetic member 252. The first magnetic member 251 is shaped as a prism including a first end 2511, a second end 2512 and a third end 2513. The first end 2511 is a sleeve, and the second end 2512 and the third end 2513 are arrises of the first magnetic member 251. Each of the first magnetic member 251 and the second magnetic member 252 includes a N-pole side 2514, 2521 and a S-pole side 2515, 2522.

In assembly, the first end 2511 of each first magnetic member 251 is rotatably connected to the fixing shaft 24 of a corresponding opening 23, and a second magnetic member 252 is fixed in the groove 231 of the opening 23. The same pole sides of the first magnetic member 251 and the second magnetic member 252 are opposite to each other. In this embodiment, the N-pole sides 2514, 2521 of the first magnetic member 251 and the second magnetic member 252 are opposite to each other, the second end 2512 of each first magnetic member 251 is rotated out of the corresponding opening 23 under the repulsion of the corresponding second magnetic member 252. One end of the shaft body 11 is rotatably mounted in the shaft hole 22. The two driving bars 121 are fixed on the end of the shaft body 11 and correspondingly positioned on two opposite sides of the load carrying member 20. Each driving bar 121 is resisted by the second end 2512 of a corresponding first magnetic member 251. In this embodiment, the shaft body 11 is a shaft of a motor (not shown) or is driven by a motor. The torsion acting on the first magnetic member 251 by the repulsion of the second magnetic member 252 is greater than the torsion acting on the first magnetic member 251 by the force of the driving bar 121 when the motor is working under its rated load.

When the motor is working under the rated load, the motor drives the load carrying member 20 to rotate to drive the load. When the motor is overloaded, the first magnetic members 251 are rotated into the opening 23 by the driving bars 121, and the load carrying member 20 is disengaged from the driving bars 121. The motor is therefore idled and protected from damage when overloaded.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An overload protection device for protecting a motor from overload, the overload protection device comprising:

a shaft comprising a cylindrical shaft body and a driving portion on an end of the shaft body, for outputting torsion from the motor, and a load carrying member driven by the driving portion of the shaft for transmitting the torsion from the motor to a load to drive the load, the load carrying member comprising at least one magnetic member corresponding to the driving portion of the shaft, each of the at least one magnetic member comprising a first magnetic member rotatably fixed on the load carrying member and a second magnetic member fixed on the load carrying member, the first magnetic member being located between the second magnetic member and the driving portion of the shaft and the same pole sides of the first magnetic member and the second magnetic member being opposite to each other;

wherein, the driving portion is engaged with the first magnetic member and drives the first magnetic member to rotate the load carrying member under the rated load of the motor, and the driving portion overcomes the repulsive force between the first magnetic member and the second magnetic member to rotate the first magnetic member relative to the load carrying member, thereby the driving portion is disengaged from the first magnetic member during an overload of the motor working.

2. The overload protection device of claim 1, wherein a shaft hole is defined in the center of the load carrying member for receiving the end of the shaft with the driving portion and at least one opening is defined in the load carrying member corresponding to the at least one magnetic member and offset from the shaft hole, and the at least one magnetic member is mounted in the at least one opening.

3. The overload protection device of claim 2, wherein each of the at least one opening comprises two opposite side surfaces, a fixing shaft is fixed on one of the opposite side surfaces, and a groove is defined in the other of the opposite side surfaces, the first magnetic member of each of the at least one magnetic member is rotatably connected to the fixing shaft of a corresponding one of the at least one opening, and the second magnetic member of each of the at least one magnetic member is fixed in the groove of the corresponding one of the at least one opening.

4. The overload protection device of claim 3, wherein the first magnetic member is shaped as a prism comprising a first end, a second end and a third end, the first end is a sleeve and the second end and the third end are arrises of the first magnetic member, the second end of the first magnetic member is rotated out of the corresponding opening under the repulsive force of the corresponding second magnetic member.

5. The overload protection device of claim 4, wherein the driving portion comprises a number of driving bars radially protruding from the shaft body, the number of the driving bars are separated from each other for a distance along a central axis of the shaft body, each driving bar is resisted by the second end of a corresponding one of the first magnetic members.

6. The overload protection device of claim 2, wherein each of the at least one opening is sector-shaped.

7. The overload protection device of claim 1, wherein the load carrying member is shaped as a wheel and comprises a first side surface and a second side surface opposite to the first side surface.

8. The overload protection device of claim 1, wherein the load carrying member is a gear wheel or a belt pulley.

* * * * *